United States Patent
Tang et al.

(10) Patent No.: US 12,129,321 B2
(45) Date of Patent: Oct. 29, 2024

(54) CROSS-LINKED SBR MICROSPHERE BINDER AND PREPARATION METHOD THEREOF AND LITHIUM-ION BATTERY CONTAINING THE BINDER

(71) Applicant: Zhuhai CosMX Battery Co., Ltd., Zhuhai (CN)

(72) Inventors: Weichao Tang, Zhuhai (CN); Suli Li, Zhuhai (CN); Wei Zhao, Zhuhai (CN); Hao Yuan, Zhuhai (CN); Junyi Li, Zhuhai (CN); Yanming Xu, Zhuhai (CN)

(73) Assignee: ZHUHAI COSMX BATTERY CO., LTD. (CN)

( * ) Notice: Subject to any disclaimer, the term of this patent is extended or adjusted under 35 U.S.C. 154(b) by 559 days.

(21) Appl. No.: 17/402,272

(22) Filed: Aug. 13, 2021

(65) Prior Publication Data
US 2021/0371565 A1    Dec. 2, 2021

Related U.S. Application Data

(63) Continuation of application No. PCT/CN2020/074724, filed on Feb. 11, 2020.

(30) Foreign Application Priority Data

Feb. 18, 2019 (CN) .......................... 201910120401.3

(51) Int. Cl.
*C08F 236/10* (2006.01)
*C08J 9/20* (2006.01)
(Continued)

(52) U.S. Cl.
CPC .............. *C08F 236/10* (2013.01); *C08J 9/20* (2013.01); *H01M 4/622* (2013.01); *C08J 2309/06* (2013.01); *H01M 10/0525* (2013.01)

(58) Field of Classification Search
CPC ........ H01M 4/62; H01M 4/621; H01M 4/622; H01M 4/623; H01M 4/13; H01M 50/414;
(Continued)

(56) References Cited

U.S. PATENT DOCUMENTS 4,990,541 A    2/1991  Nielsen et al.

FOREIGN PATENT DOCUMENTS

| CN | 101156264 A | 4/2008 |
|---|---|---|
| CN | 101323447 A | 12/2008 |

(Continued)

OTHER PUBLICATIONS

Ha et al., "Large and monodispersed polymeric microspheres with high butadiene rubber content via membrane emulsification," 1998, Colloids and Surfaces, 145, 281-284. (Year: 1998).*

(Continued)

*Primary Examiner* — Matthew W Van Oudenaren
(74) *Attorney, Agent, or Firm* — Dilworth IP, LLC (57) ABSTRACT

A cross-linked SBR microsphere binder and a preparation method, and a lithium-ion battery containing the binder, the cross-linked SBR microsphere binder has a porous cross-linked structure, the cross-linked SBR microsphere has a particle size of 10 nm-1 μm, and a porosity of 0.01%-40%, and a pore diameter of the pore is greater than 0 and less than or equal to 200 nm. The lithium-ion battery containing the binder has advantages of better rate performance, low temperature performance, fast charge performance, and long cycle performance, compared with a lithium-ion battery containing a conventional SBR binder.

18 Claims, 2 Drawing Sheets

(51) Int. Cl.
*H01M 4/62* (2006.01)
*H01M 10/0525* (2010.01)

(58) Field of Classification Search
CPC .. H01M 50/417; H01M 50/42; H01M 50/423;
H01M 50/426; H01M 50/443; H01M
50/491; H01M 50/489; H01M 10/0525;
C08F 236/10; C08F 212/08; C08J 9/20;
C08J 9/286; C08J 2309/06; C08J
2201/0544; C08J 2201/026; C08J
2205/042
See application file for complete search history.

(56) References Cited

FOREIGN PATENT DOCUMENTS

| | | | |
|---|---|---|---|
| CN | 102142560 | A | 8/2011 |
| CN | 103947020 | A | 7/2014 |
| CN | 105324868 | A | 2/2016 |
| CN | 106147950 | A | 11/2016 |
| CN | 106328865 | * | 1/2017 |
| CN | 106328865 | A | 1/2017 |
| CN | 106519119 | A | 3/2017 |
| CN | 108359050 | A | 8/2018 |
| CN | 109273717 | * | 1/2019 |
| CN | 109273717 | A | 1/2019 |
| CN | 109320972 | A | 2/2019 |
| CN | 109786749 | A | 5/2019 |
| JP | 2018190703 | A | 11/2018 |
| WO | 2014189294 | A1 | 11/2014 |

OTHER PUBLICATIONS

Zhang et al., "Mass Production and Pore Size Control of Holey Carbon Microcages," 2017, Angew. Chem. Int. Ed., 56, 13790-13794. (Year: 2017).*
Scholten, Dr. Christoph, The Diversity of Styrene-Gutadiene Rubber Latex, www.rubbernews.com/assets/PDF/RN86222218.pdf, Jan. 1, 2006, pp. 1-7.
Trunschke, A., Surface area and pore size determination, Modern Methods in Heterogeneous Catalysis Research, Nov. 1, 2013, pp. 1-52.
Mercury Intrusion Porosimetry Theory Presented by Micromeritics Instrument Corporation, www.micromeritics.com/Repository/Files/Mercury_Porosemitry_Theory_poster_pdf, Jul. 12, 2017, one page.
A Basic Guide to Particle Characterization, Malvern Instruments Worldwide—White Paper, http://golik.co.il/Data/ABasicGuidtoParticleCharacterization(2)_1962085150.pdf, May 2, 2012, pp. 1-26.
European Search Report in EP Patent Application No. 20758651.2 dated Mar. 28, 2022.
Huang, et al. "Synthesis and Characterization of Crosslinked Porous Poly(styrene-co-divinylbenzene) Microspheres with Tunable Particle and Pore Diameters", Chinese Journal of Applied Chemistry, Apr. 2016.
Office Action issued in Chinese Patent Application No. 201910120401.3 on Aug. 17, 2020, 7 pages.
Notice of Allowance issued in Chinese Patent Application No. 201910120401.3 on Mar. 5, 2021, 2 pages.
International Search Report issued in International Application No. PCT/CN2020/074724 on May 9, 2020, 13 pages.

* cited by examiner

CROSS-LINKED SBR MICROSPHERE BINDER AND PREPARATION METHOD THEREOF AND LITHIUM-ION BATTERY CONTAINING THE BINDER

CROSS-REFERENCE TO RELATED APPLICATIONS

The present application is a continuation of International Application No. PCT/CN2020/074724, filed on Feb. 11, 2020, which claims priority to Chinese Patent Application No. 201910120401.3, with a title of "cross-linked SBR microsphere binder and preparation method and lithium-ion battery containing the binder", filed with the Chinese Patent Office on Feb. 18, 2019. The disclosures of the aforementioned applications are hereby incorporated by reference in their entireties.

TECHNICAL FIELD

The present application belongs to the technical field of lithium-ion batteries and, in particular, relates to a cross-linked SBR microsphere binder and a preparation method thereof and a lithium-ion battery containing the binder.

BACKGROUND

Lithium-ion batteries have the characteristics of long cycle life, no memory effect, high energy density, low environmental pollution, and so on. In recent years, they have been widely used in the digital field and power vehicle field. A lithium-ion battery is mainly composed of a positive electrode, a negative electrode, a separator, and an electrolytic solution, where the compositions of the positive electrode and the negative electrode contain a binder, respectively. As an important part of the lithium-ion battery, the binder is mainly responsible for tightly binding an electrode active substance, a conductive agent, and a current collector in an electrode sheet together so as to make the electrode sheet have good processability, and more importantly, to ensure that a cell prepared can maintain its electrochemical performance for a long time.

Conventional binders for lithium-ion batteries mainly include polyvinyl alcohol, polytetrafluoroethylene, polyvinylidene fluoride, polyvinylidene fluoride-hexafluoropropylene, a combination of modified styrene-butadiene rubber and sodium carboxymethyl cellulose, fluorinated rubber, polyurethane, polyacrylic acid, and other systems. Among them, the binder of the combination of the modified styrene-butadiene rubber and sodium carboxymethyl cellulose has been widely used in lithium-ion batteries due to its stable performance and price advantage, where sodium carboxymethyl cellulose and the modified styrene-butadiene rubber are used as a thickener and a binder, respectively. It is worth noting that due to the influence of the chemical structure of styrene-butadiene rubber (SBR) itself, SBR has a weaker affinity with an electrolytic solution, and there are problems of poor liquid absorption effect of electrode sheets, low liquid storage of cells, poor high-ratio discharge performance, poor low-temperature performance, poor long-cycle performance, and so on during the preparation process of lithium-ion batteries.

In order to improve the affinity of styrene-butadiene rubber with the electrolytic solution, and increase performances of lithium-ion batteries, the Chinese patent application with an application number of CN 201810283260.2 discloses a carbon black modified aqueous SBR binder for lithium-ion batteries and a preparation method thereof, where styrene and butadiene are used as raw materials, the carbon black modified aqueous SBR is obtained by bonding conductive carbon black onto a SBR molecular chain by an in-situ emulsion polymerization method. However, in this method, carbon black cannot be effectively bonded, and the material stability thereof is difficult to control. The Chinese patent application with an application number of CN 201711144903.7 discloses a method for preparing a modified styrene-butadiene rubber type of a binder for a negative electrode, in which styrene-butadiene rubber and acrylic acid are mixed, stirred, and then irradiated, and an irradiated product and sodium hydroxide are mixed, stirred, and then washed to obtain a modified styrene-butadiene rubber, where acrylic acid having a good affinity with the electrolytic solution is used to modify styrene-butadiene rubber in this method. However, the use of irradiation in this method will cause incomplete polymerization and modification, and the like, the improvement of performances of a whole lithium-ion battery is limited.

A conventional modified SBR microsphere binder has a particle size of about 80 nm-250 nm, and there is a certain cross-linked structure inside microspheres. According to product needs, there are SBRs with a high crosslinking degree and a low crosslinking degree, a good SBR should also have better liquid absorption performance and smaller expansion performance in meeting the needs for basic applications. Conventional modified SBR microspheres have a smooth surface, and at present, a structure having a good affinity with the electrolytic solution is introduced mainly by grafting or copolymerization technologies to achieve the purpose of modification.

SUMMARY

An objective of the present application is to provide a cross-linked SBR microsphere binder, a preparation method thereof, and a lithium-ion battery containing the binder, and the lithium-ion battery containing the binder has advantages of better rate performance, low temperature performance, fast charge performance, and long cycle performance, compared with a lithium-ion battery containing a conventional SBR binder.

In order to achieve the above objective, the following technical solutions are adopted in the present application:

a cross-linked SBR microsphere binder, where the cross-linked SBR microsphere has a porous cross-linked structure.

Furthermore, the cross-linked SBR microsphere has a particle size of 10 nm-1 μm.

Furthermore, the cross-linked SBR microsphere has a porosity of 0.01%-40%.

Furthermore, the cross-linked SBR microsphere has a porosity of 4%-29%.

Furthermore, the cross-linked SBR microsphere has a porosity of 12%-29%.

Furthermore, the pore has a pore diameter of greater than 0 and less than or equal to 200 nm.

Furthermore, the cross-linked SBR microsphere binder is obtained by polymerizing a system A and an oxidizing agent, and then subjecting the polymerized system to demulsification, extraction, and washing to obtain the cross-linked SBR microsphere binder;

the system A includes deionized water, polymerization-inhibitor-removed styrene, a pore-forming agent, polymerization-inhibitor-removed butadiene, a molecular weight regulator, an emulsifier, a co-emulsifier, a deoxidizing agent, an electrolyte, a reducing agent, and a complexing agent.

Furthermore, the system A further includes a modified monomer.

Furthermore, the modified monomer is one or more of unsaturated alkenyl polyether and its derivative, unsaturated alkenyl ester and its derivative, unsaturated alkenyl alcohol ether and its derivative, unsaturated alkenyl nitrile and its derivative, and unsaturated alkenyl acid and its derivative.

A method for preparing a cross-linked SBR microsphere binder includes the following steps:
- step 1: spraying butadiene and styrene with a sodium hydroxide aqueous solution having a mass fraction of 8%-16% at 20-40° C., respectively, and then washing with deionized water to be neutral, respectively, to obtain polymerization-inhibitor-removed butadiene and polymerization-inhibitor-removed styrene;
- step 2: based on the part by mass, adding 200-800 parts of the deionized water, 25-100 parts of the polymerization-inhibitor-removed styrene, 200-800 parts of a pore-forming agent, 75-300 parts of a polymerization-inhibitor-removed butadiene, and 0-50 parts of a modified monomer to a reactor, stirring to mix well, adding 0.16-0.72 parts of a molecular weight regulator, 4.62-20.79 parts of an emulsifier, 0.15-0.675 parts of a co-emulsifier, 0.025-0.18 parts of a deoxidizing agent and 0.24-2.03 parts of an electrolyte, continuously stirring to mix well, and keeping a temperature to 25-35° C.; then adding 0.01-0.045 parts of a reducing agent, and 0.01-1.13 parts of a complexing agent, mixing fully to obtain a system A, and reducing the temperature to 5-8° C.;
- step 3: adding 0.06-0.54 parts of an oxidizing agent to the system A to start polymerization, wherein a polymerization pressure is 0.1-0.3 MPa, a polymerization temperature is 5-8° C., a stirring speed is 100-130 r/min, and a polymerization time is 7-12 h, after the polymerization is completed, adding 0.1-0.45 parts of a terminator and 0.06-0.5 parts of an auxiliary terminator to obtain a modified SBR latex;
- step 4: subjecting the modified SBR latex to demulsification, extraction, and washing to obtain the cross-linked SBR microsphere binder.

Furthermore, in the step 2, the pore-forming agent is one or more of alkanes and a derivative system thereof, alcohols and a derivative system thereof, ethers and a derivative system thereof, aromatics and a derivative system thereof, ketones and a derivative system thereof, esters and a derivative system thereof, chlorides and a derivative system thereof, amines and a derivative system thereof, oligomeric polystyrene and a derivative system of oligomeric polyaromatics, oligomeric polyether and a derivative system of polyether, a derivative system of oligomeric polyvinyl alcohol ether, oligomeric polyacrylonitrile and a derivative system of polynitrile, oligomeric polyacrylic acid and a derivative system of polyacrylic acid.

Furthermore, in the step 2, the modified monomer is one or more of unsaturated alkenyl polyether and its derivative, unsaturated alkenyl ester and its derivative, unsaturated alkenyl alcohol ether and its derivative, unsaturated alkenyl nitrile and its derivative, and unsaturated alkenyl acid and its derivative.

A method for preparing a cross-linked SBR microsphere binder includes the following steps:
- step 1: spraying styrene with a sodium hydroxide aqueous solution having a mass fraction of 8%-16% at 20-40° C., and then washing with deionized water to be neutral, to obtain polymerization-inhibitor-removed styrene;
- step 2: based on the part by mass, adding 200-800 parts of the deionized water, 25-100 parts of the polymerization-inhibitor-removed styrene, 200-800 parts of a pore-forming agent, 75-300 parts of butadiene, and 0-50 parts of a modified monomer to a reactor, stirring to mix well, adding 0.16-0.72 parts of a molecular weight regulator, 4.62-20.79 parts of an emulsifier, 0.15-0.675 parts of a co-emulsifier, 0.025-0.18 parts of a deoxidizing agent and 0.24-2.03 parts of an electrolyte, and continuously stirring to mix well, and keeping a temperature to 25-35° C.; then adding 0.01-0.045 parts of a reducing agent, and 0.01-1.13 parts of a complexing agent, mixing fully to obtain a system A, and reducing the temperature to 5-8° C.;
- step 3: adding 0.06-0.54 parts of an oxidizing agent to the system A to start polymerization, wherein a polymerization pressure is 0.1-0.3 MPa, a polymerization temperature is 5-8° C., a stirring speed is 100-130 r/min, and a polymerization time is 7-12 h, after the polymerization is completed, adding 0.1-0.45 parts of a terminator and 0.06-0.5 parts of an auxiliary terminator to obtain a modified SBR latex;
- step 4: subjecting the modified SBR latex to demulsification, extraction, and washing to obtain the cross-linked SBR microsphere binder.

Furthermore, before the step 2, it further comprises subjecting the butadiene to a pretreatment, and the pretreatment comprises: spraying the butadiene with the sodium hydroxide aqueous solution having a mass fraction of 8%-16% at 20-40° C., and then washing with the deionized water to be neutral.

Furthermore, in the step 2, the pore-forming agent is one or more of alkanes and a derivative system thereof, alcohols and a derivative system thereof, ethers and a derivative system thereof, aromatics and a derivative system thereof, ketones and a derivative system thereof, esters and a derivative system thereof, chlorides and a derivative system thereof, amines and a derivative system thereof, oligomeric polystyrene and a derivative system of oligomeric polyaromatics, oligomeric polyether and a derivative system of polyether, a derivative system of oligomeric polyvinyl alcohol ether, oligomeric polyacrylonitrile and a derivative system of polynitrile, oligomeric polyacrylic acid and a derivative system of polyacrylic acid.

Furthermore, in the step 2, the modified monomer is one or more of unsaturated alkenyl polyether and its derivative, unsaturated alkenyl ester and its derivative, unsaturated alkenyl alcohol ether and its derivative, unsaturated alkenyl nitrile and its derivative, and unsaturated alkenyl acid and its derivative.

A lithium-ion battery includes a positive electrode, a negative electrode, and a separator;
- at least one of the positive electrode, the negative electrode, and the separator includes the cross-linked SBR microsphere binder according to any one of the above.

Use of the above cross-linked SBR microsphere binder in lithium-ion batteries.

The beneficial effects of the present application:

The present application is different from a conventional modified styrene-butadiene rubber, a method of micromorphology design is used, and styrene-butadiene rubber microspheres with a porous structure is prepared using a pore-forming agent in the preparation process of the conventional modified styrene-butadiene rubber.

A production process of SBR for conventional lithium-ion batteries is referred to in the present application, the pore-forming agent is introduced in the production process of conventional SBR. The pore-forming agent has a certain affinity with SBR and does not participate in a system reaction during the entire process, and after being subjected to subsequent treatments, SBR microspheres with a porous structure can be formed. The SBR microspheres with the porous structure prepared in the present application have the same chemical structure as conventional SBR microspheres, and the difference mainly lies in that the SBR microspheres with the porous structure of the present application have more pores and cross-linked structures, which have better liquid absorption performance and less swelling compared with conventional microspheres. An electrode sheet prepared with the SBR microspheres having the porous structure as a binder has good liquid absorption performance and good lithium-ion transport channels. Compared with lithium-ion batteries using conventional SBR binders, the lithium-ion battery prepared with the SBR microspheres having the porous structure as a binder has obvious advantages in terms of rate performance, low temperature performance, fast charge performance, and long cycle performance.

At the same time, in the present application, the porosity of the SBR microspheres may be controlled by controlling the type, the addition amount, and the degree of reaction of the pore-forming agent, etc. When the porosity is within a certain range, the SBR with the porous structure has good adhesion, cross-linking degree, and a certain porosity, and has good application prospects in lithium-ion batteries in the digital and power directions.

DESCRIPTION OF EMBODIMENTS

Figure 1:
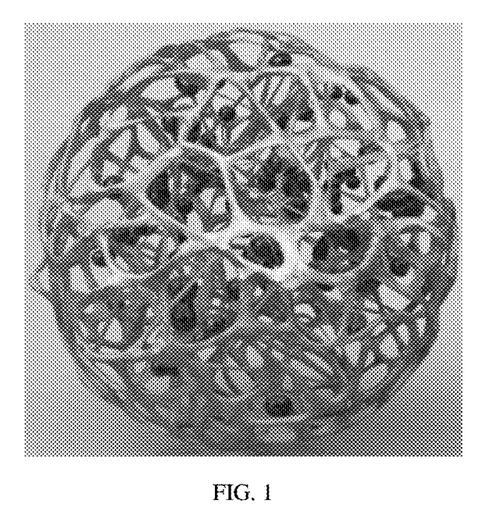
FIG. 1 is a schematic diagram of a modified SBR microsphere of the present application.
Figure 2:
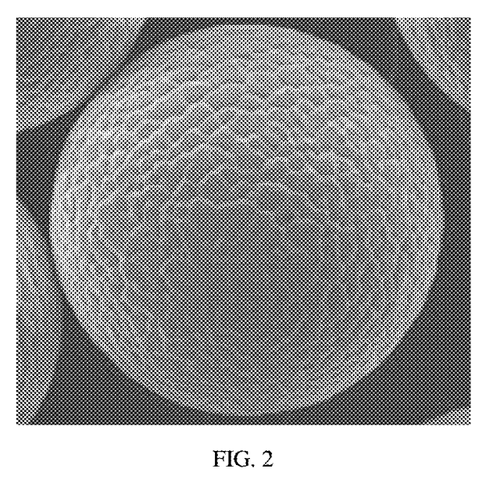
FIG. 2 is the first electron microscope image of a conventional SBR microsphere.
Figure 3:
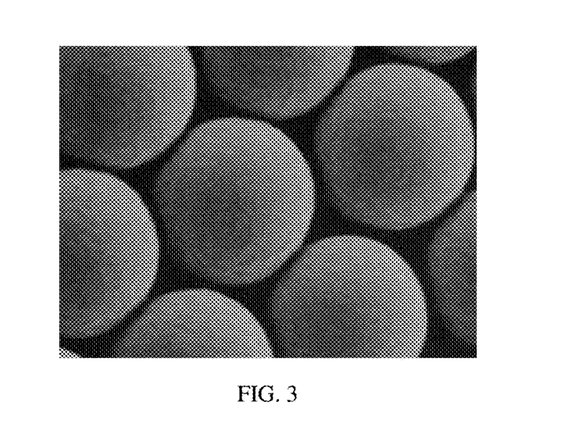
FIG. 3 is the second electron microscope image of the conventional SBR microsphere.

FIG. 1 is a schematic diagram of a modified SBR microsphere of the present application, FIG. 2 is the first electron microscope image of a conventional SBR microsphere, and FIG. 3 is the second electron microscope image of the conventional SBR microsphere. The present application will be further described below in combination with FIGS. 1-3.

The first specific embodiment:
a cross-linked SBR microsphere binder, and the cross-linked SBR microsphere has a porous cross-linked structure.

Furthermore, the cross-linked SBR microsphere has a particle size of 10 nm-1 μm, preferably, the cross-linked SBR microsphere has a particle size of 50 nm-250 nm.

Furthermore, the cross-linked SBR microsphere has a porosity of 0.01%-40%.

Furthermore, the cross-linked SBR microsphere has a porosity of 4%-29%.

Furthermore, the cross-linked SBR microsphere has a porosity of 12%-29%.

Furthermore, the pore has a pore diameter of greater than 0 and less than or equal to 200 nm, and the pore includes micropore, mesopore, and macropore. The micropore has a pore diameter of less than 2 nm, the mesopore has a pore diameter of 2 nm-50 nm, and the macropore has a pore diameter of 50 nm-200 nm.

Furthermore, the cross-linked SBR microsphere binder is obtained by polymerizing a system A and an oxidizing agent, and then subjecting the polymerized system to demulsification, extraction, and washing. The system A includes deionized water, polymerization-inhibitor-removed styrene, a pore-forming agent, polymerization-inhibitor-removed butadiene, a molecular weight regulator, an emulsifier, a co-emulsifier, a deoxidizing agent, an electrolyte, a reducing agent, and a complexing agent.

Furthermore, the system A further includes a modified monomer. Furthermore, the modified monomer is one or more of unsaturated alkenyl polyether and its derivative, unsaturated alkenyl ester and its derivative, unsaturated alkenyl alcohol ether and its derivative, unsaturated alkenyl nitrile and its derivative, and unsaturated alkenyl acid and its derivative.

A method for preparing a cross-linked SBR microsphere binder includes the following steps:
  step 1: spraying butadiene and styrene with a sodium hydroxide aqueous solution having a mass fraction of 8%-16% at 20-40° C. for 10 min-4 h, respectively, and then washing with deionized water to be neutral, respectively, to obtain polymerization-inhibitor-removed butadiene and polymerization-inhibitor-removed styrene;
  step 2: based on the part by mass, adding 200-800 parts of the deionized water, 25-100 parts of the polymerization-inhibitor-removed styrene, 200-800 parts of a pore-forming agent, 75-300 parts of the polymerization-inhibitor-removed butadiene, and 0-50 parts of a modified monomer to a reactor, stirring to mix well, adding 0.16-0.72 parts of a molecular weight regulator, 4.62-20.79 parts of an emulsifier, 0.15-0.675 parts of a co-emulsifier, 0.025-0.18 parts of a deoxidizing agent, and 0.24-2.03 parts of an electrolyte, continuously stirring to mix well, and keeping a temperature to 25-35° C.; then after 5-20 min, adding 0.01-0.045 parts of a reducing agent, and 0.01-1.13 parts of a complexing agent, mixing fully to obtain a system A, and reducing the temperature to 5-8° C.;
  step 3: adding 0.06-0.54 parts of an oxidizing agent to the system A to start polymerization, wherein a polymerization pressure is 0.1-0.3 MPa, a polymerization temperature is 5-8° C., a stirring speed is 100-130 r/min, and a polymerization time is 7-12 h, after the polymerization is completed, adding 0.1-0.45 parts of a terminator and 0.06-0.5 parts of an auxiliary terminator to react for 5-30 min to obtain a modified SBR latex;
  step 4: mixing the modified SBR latex with 20%-30% sodium chloride solution, then mixing with 0.5% dilute sulfuric acid, stirring well, adding deionized water for several times, washing at 50-70° C. to remove sodium chloride and dilute sulfuric acid, then performing a heat treatment with an organic solvent at 50-70° C. for several times for extraction, and then adding the deionized water for several times to remove the organic solvent, thus obtaining the cross-linked SBR microsphere binder.

The above preparation method may be carried out in any vessel suitable for pressurization, for example, an autoclave may be used to complete the above preparation.

Preferably, in the step 2, the pore-forming agent is a solvent or a linear oligomer that has good compatibility with polymerized monomers. The pore-forming agent is one or more of alkanes and a derivative system thereof, alcohols and a derivative system thereof, ethers and a derivative system thereof, aromatics and a derivative system thereof, ketones and a derivative system thereof, esters and a derivative system thereof, chlorides and a derivative system thereof, amines and a derivative system thereof, oligomeric polystyrene and a derivative system of oligomeric polyaromatics, oligomeric polyether and a derivative system of polyether, a derivative system of oligomeric polyvinyl alcohol ether, oligomeric polyacrylonitrile and a derivative system of polynitrile, oligomeric polyacrylic acid and a derivative system polyacrylic acid.

Preferably, the alkane is one or more of alkanes having a carbon molecular weight of C5-C13, preferably, the alkane is cyclohexane, n-heptane, or n-octane. The alcohol is one or more of methanol, isooctyl alcohol, n-propanol, 2-ethylbutanol, isopropanol methanol, cyclohexanol, dodecanol, isoamyl alcohol, and glycerol. The ether is n-butyl ether and/or di-n-amyl ether. The aromatic is one or more of toluene, xylene, and benzene, and the derivative system of the aromatics is diethyl phthalate. The ketone is acetone and/or methyl ethyl ketone. The nitrile is succinonitrile and/or acetonitrile. The ester is ethyl acetate and/or fatty acid methyl ester. The chloride is chloroform and/or 1,2-dichloro ethane. The amine is urea, and the derivative system of the amine is amino acid. The oligomeric polystyrene is polystyrene. The oligomeric polyether is polyethylene glycol monomethyl ether, and the derivative system of the polyether is polyethylene glycol. The derivative system of oligomeric polyvinyl alcohol ether is polyvinyl alcohol. The oligomeric polyacrylonitrile is polyacrylonitrile, and the derivative system of polynitrile is polyacetonitrile. The oligomeric polyacrylic acid is polyacrylic acid.

Furthermore, in the step 2, the modified monomer is one or more of unsaturated alkenyl polyether and its derivative, unsaturated alkenyl ester and its derivative, unsaturated alkenyl alcohol ether and its derivative, unsaturated alkenyl nitrile and its derivative, and unsaturated alkenyl acid and its derivative.

Preferably, the unsaturated alkenyl polyether is polyethylene glycol monoallyl ether, the derivative of the unsaturated alkenyl polyether is one or more of polyethylene glycol methyl methacrylate, polyethylene glycol methyl acrylate, polyethylene glycol diacrylate, polyethylene glycol monomethyl ether methyl methacrylate, and polyethylene glycol monomethyl ether methyl acrylate. The unsaturated alkenyl ester is one or more of methyl methacrylate, methyl acrylate, 2-ethylhexyl acrylate, and ethyl methacrylate. The unsaturated alkenyl alcohol ether is polyethylene glycol monoallyl ether. The unsaturated alkenyl nitrile is acrylonitrile. The unsaturated alkenyl acid is acrylic acid.

Furthermore, the molecular weight regulator, the deoxidizing agent, the emulsifier, the co-emulsifier, the oxidizing agent, the reducing agent, the complexing agent, the electrolyte, the terminator and the auxiliary terminator in the step 2 are all industrial reagents which are industrially produced in mature SBR, where the molecular weight regulator is one or more of aliphatic mercaptans, xanthate disulfides, polyphenol, sulfur, halide, and nitroso compound, preferably, the aliphatic mercaptan is dodecyl mercaptan, and the xanthate disulfide is dithiodiisopropyl xanthate. The deoxidizing agent is an inorganic deoxidizing agent and/or an organic deoxidizing agent, preferably the inorganic deoxidizing agent is sodium dithionite dehydrate. The emulsifier is one or more of anionic emulsifier, cationic emulsifier, and nonionic emulsifier, preferably, the emulsifier is fatty acid soap and/or disproportionated rosin acid soap. The co-emulsifier is one or more of commonly used naphthalenesulfonic acid, and the sodium salt of naphthalenesulfonic acid and formaldehyde condensate, preferably, the sodium salt of naphthalenesulfonic acid and the formaldehyde condensate is sodium methylene bisnaphthalene sulfonate. The oxidizing agent is an organic peroxide, preferably, the organic peroxide is cumene hydrogen peroxide and/or hydrogen peroxide p-menthane. The reducing agent is a ferrous salt, and preferably, the ferrous salt is ferrous sulfate. The complexing agent is a complexing agent that complexes with iron, and preferably is ethylenediamine tetraacetic acid-disodium salt. The electrolyte is one or more of soluble phosphate, chloride, and sulfate, preferably, the soluble phosphate is potassium phosphate. The terminator is sodium dimethyl dithiocarbamate. The auxiliary terminator is one or more of sodium nitrite, sodium polysulfide, and polyvinylamine.

Preferably, the organic solvent in the step 4 is one or more of ether, acetone, ethylene oxide, methanol, and benzene.

A method for preparing a cross-linked SBR microsphere binder includes the following steps:

step 1: spraying styrene with a sodium hydroxide aqueous solution having a mass fraction of 8%-16% at 20-40° C., and then washing with deionized water to be neutral, to obtain a polymerization-inhibitor-removed styrene;

step 2: based on the part by mass, adding 200-800 parts of the deionized water, 25-100 parts of the polymerization-inhibitor-removed styrene, 200-800 parts of a pore-forming agent, 75-300 parts of butadiene, and 0-50 parts of a modified monomer to a reactor, stirring to mix well, adding 0.16-0.72 parts of a molecular weight regulator, 4.62-20.79 parts of an emulsifier, 0.15-0.675 parts of a co-emulsifier, 0.025-0.18 parts of a deoxidizing agent, and 0.24-2.03 parts of an electrolyte, and continuously stirring to mix well, and keeping a temperature to 25-35° C.; then adding 0.01-0.045 parts of a reducing agent, and 0.01-1.13 parts of a complexing agent, mixing fully to obtain a system A, and reducing the temperature to 5-8° C.;

step 3: adding 0.06-0.54 parts of an oxidizing agent to the system A to start polymerization, wherein a polymerization pressure is 0.1-0.3 MPa, a polymerization temperature is 5-8° C., a stirring speed is 100-130 r/min, and a polymerization time is 7-12 h, after the polymerization is completed, adding 0.1-0.45 parts of a terminator and 0.06-0.5 parts of an auxiliary terminator to obtain a modified SBR latex;

step 4: mixing the modified SBR latex with 20%-30% sodium chloride solution, then mixing with 0.5% dilute sulfuric acid, stirring well, adding deionized water for several times, washing at 50-70° C. to remove sodium chloride and dilute sulfuric acid, then performing a heat treatment with an organic solvent at 50-70° C. for several times for extraction, and then adding the deionized water for several times to remove the organic solvent, thus obtaining the cross-linked SBR microsphere binder.

The above preparation method may be carried out in any vessel suitable for pressurization, for example, an autoclave may be used to complete the above preparation.

Preferably, before the step 2, it further includes pretreatment of the butadiene, and the pretreatment includes: spraying the butadiene with the sodium hydroxide aqueous solution having a mass fraction of 8%-16% at 20-40° C., and then washing with the deionized water to be neutral.

Preferably, in the step 2, the pore-forming agent is one or more of alkanes and a derivative system thereof, alcohols and a derivative system thereof, ethers and a derivative system thereof, aromatics and a derivative system thereof, ketones and a derivative system thereof, esters and a derivative system thereof, chlorides and a derivative system thereof, amines and a derivative system thereof, oligomeric polystyrene and a derivative system of oligomeric polyaromatics, oligomeric polyether and a derivative system of polyether, a derivative system of oligomeric polyvinyl alcohol ether, oligomeric polyacrylonitrile and a derivative system of polynitrile, oligomeric polyacrylic acid and a derivative system of polyacrylic acid.

Furthermore, in the step 2, the modified monomer is one or more of unsaturated alkenyl polyether and its derivative, unsaturated alkenyl ester and its derivative, unsaturated alkenyl alcohol ether and its derivative, unsaturated alkenyl nitrile and its derivative, and unsaturated alkenyl acid and its derivative.

A lithium-ion battery includes a positive electrode, a negative electrode, and a separator; at least one of the positive electrode, the negative electrode, and the separator includes the cross-linked SBR microsphere binder described in any one of the above.

Furthermore, a positive electrode active material of the lithium-ion battery is one or more of lithium cobaltate, nickel-cobalt-aluminum ternary material, lithium iron phosphate, nickel-cobalt-manganese ternary material, lithium manganate, and sulfur. A negative electrode active material is carbon material, lithium metal negative electrode, nitride, silicon-based material, tin-based oxide, stannide, tin-based alloy, antimony-based alloy, germanium-based alloy, aluminum-based alloy, lead-based alloy, titanium oxide, nano transition metal oxide MO (M=Co, Ni, Cu, Fe), iron oxide, chromium oxide, molybdenum oxide and phosphide.

Furthermore, the lithium-ion battery is a liquid lithium-ion battery, a semi-solid lithium-ion battery or an all-solid lithium-ion battery.

Furthermore, the lithium-ion battery is a liquid lithium-sulfur battery, a semi-solid or solid lithium-sulfur battery, a battery with lithium cobaltate as a positive electrode, a solid nickel-cobalt-aluminum battery, a solid lithium iron phosphate battery, a solid nickel-cobalt-manganese ternary material battery, a solid lithium manganate battery, or a lithium-ion battery containing electrolytic solution and carbon material as a negative electrode.

The application will be further described below through specific examples. The reagents, materials, and instruments used in the following descriptions are conventional reagents, conventional materials, and conventional instruments unless otherwise specified, all of which are commercially available, and the reagents involved can also be synthesized by conventional synthetic methods.

Example 1

A method for preparing a cross-linked SBR microsphere binder includes the following steps:
step 1: spraying butadiene and styrene with a sodium hydroxide aqueous solution having a mass fraction of 8% at 20° C. for 4 h, respectively, and then washing with deionized water to be neutral, respectively, to obtain polymerization-inhibitor-removed butadiene and polymerization-inhibitor-removed styrene;
step 2: based on the part by mass, adding 200 parts of deionized water, 25 parts of the polymerization-inhibitor-removed styrene, 80 parts of n-heptane, 20 parts of n-propanol, 20 parts of methanol, 40 parts of glycerin, 40 parts of xylene, and 75 parts of the polymerization-inhibitor-removed butadiene to a reactor, stirring to mix well, adding 0.16 parts of dodecyl mercaptan, 4.62 parts of disproportionated rosin acid soap, 0.15 parts of sodium methylene bisnaphthalene sulfonate, 0.025 parts of sodium dithionite dihydrate, and 0.24 parts of potassium phosphate, continuously stirring to mix well, and keeping a temperature to 25° C.; after 20 minutes, adding 0.01 parts of ferrous sulfate and 0.01 parts of ethylenediamine tetraacetic acid-disodium salt, mixing fully to obtain a system A, and reducing the temperature to 5° C.
step 3: adding 0.06 parts of cumene hydrogen peroxide to the system A to start polymerization, where polymerization conditions include a pressure in the reactor being adjusted to 0.1 MPa, a polymerization temperature of 8° C., a stirring speed of 100 r/min, and a polymerization time of 7 h, after the polymerization is completed, adding 0.1 parts of sodium dimethyl dithiocarbamate, 0.02 parts of sodium nitrite, 0.02 part of sodium polysulfide, and 0.02 parts of polyvinylamine to react for 5 minutes to obtain a modified SBR latex;
step 4: mixing the modified SBR latex with 20% sodium chloride solution, then mixing with 0.5% dilute sulfuric acid, then stirring well, adding deionized water for several times and washing at 50° C. to remove sodium chloride and dilute sulfuric acid, then performing a heat treatment with an organic solvent of diethyl ether at 50° C. for several times for extraction, and then adding the deionized water for several times to remove the organic solvent of diethyl ether, thus obtaining the porous cross-linked SBR microsphere binder.

The porous cross-linked SBR microsphere has a particle size of 10 nm to 100 nm, a porosity of 0.01% to 3%, and a pore diameter of greater than 0 nm and less than or equal to 10 nm.

A lithium-ion battery in this Example includes the porous cross-linked SBR microsphere binder of the above Example 1. The specific composition of the lithium-ion battery is as follows:
a negative electrode sheet: 90% of a negative electrode active material graphite, 5% of a conductive agent SP, 2% of CMC, 3% of the porous cross-linked SBR microsphere binder of this Example;
a positive electrode sheet: 90% of a positive active material NCM811, 5% of a conductive agent SP, 5% of a binder PVDF.

With the positive and negative electrodes N/P as 1.10, the lithium-ion battery of Example 1 was prepared by assembling the above negative electrode sheet and positive electrode sheet with a separator (purchased from CELGARD, 20 μm), and electrolytic solution (purchased from Xinzhoubang, LBC445A13) through a conventional lithium-ion battery preparation process.

Example 2

A method for preparing a cross-linked SBR microsphere binder includes the following steps:
step 1: the pretreatment of raw materials including the purification of monomers and the preparation of an initiators and other additional components: spraying butadiene and styrene with a sodium hydroxide aqueous solution having a mass fraction of 10% at 40° C. for 10 min, respectively, and then washing with deionized water to be neutral, to obtain polymerization-inhibitorremoved butadiene and polymerization-inhibitor-removed styrene; preparing a combination of the polymerization-inhibitor-removed butadiene, a pore-forming agent, a modified monomer, the polymerization-inhibitor-removed styrene, a molecular weight regulator, a deoxidizing agent, electrolyte, a reducing agent, a complexing agent, an oxidizing agent, an emulsifier, and a co-emulsifier, and a combination of a terminator and an auxiliary terminator into an aqueous solution or an emulsion with deionized water respectively, of which the concentration is not required. Where, the pore-forming agent includes n-octane, cyclohexane, cyclohexanol, 2-ethylbutanol, n-butyl ether, benzene, and acetonitrile, and the modified monomer is polyethylene glycol methyl methacrylate, polyethylene glycol diacrylate, and methyl methacrylate, the molecular weight regulator is dithiodiisopropyl xanthate, and the emulsifier is fatty acid soap, and the co-emulsifier is naphthalenesulfonic acid, and the deoxidizing agent is sodium dithionite dihydrate, and the electrolyte is potassium phosphate, and the reducing agent is ferrous sulfate, and the complexing agent is ethylenediamine tetraacetic acid-disodium salt, and the oxidizing agent is hydrogen peroxide p-menthane, and the terminator is sodium dimethyl dithiocarbamate, and the auxiliary terminator is sodium nitrite, sodium polysulfide, and polyvinylamine Based on the part by mass, there are 400 parts of deionized water in total amount, 50 parts of the polymerization-inhibitor-removed styrene, 100 parts of n-octane, 50 parts of cyclohexane, 30 parts of cyclohexanol, 30 parts of 2-ethylbutanol, 30 parts of n-butyl ether, 50 parts of benzene, 10 parts of acetonitrile, 150 parts of the polymerization-inhibitor-removed butadiene, 10 parts of polyethylene glycol methyl methacrylate, 2 parts of polyethylene glycol diacrylate, 8 parts of methyl methacrylate, 0.352 parts of dithiodiisopropyl xanthate, 10.16 parts of fatty acid soap, 0.33 parts of naphthalenesulfonic acid, 0.082 parts of sodium dithionite dihydrate, 0.908 parts of potassium phosphate, 0.022 parts of ferrous sulfate, 0.456 parts of ethylenediamine tetraacetic acid-disodium salt, 0.24 parts of hydrogen peroxide p-menthane, 0.22 parts of sodium dimethyl dithiocarbamate, 0.075 parts of sodium nitrite, 0.075 parts of sodium polysulfide, 0.075 parts of polyvinylamine;

step 2: adding the polymerization-inhibitor-removed butadiene, n-octane, cyclohexane, cyclohexanol, 2-ethylbutanol, n-butyl ether, benzene, acetonitrile, the polymerization-inhibitor-removed butadiene, polyethylene glycol methyl methacrylate, polyethylene glycol diacrylate, and methyl methacrylate, which are prepared in the step 1 to a reactor, stirring to mix well, adding dithiodiisopropyl xanthate, fatty acid soap, naphthalenesulfonic acid, sodium dithionite dihydrate, and potassium phosphate, continuously stirring to mix well, and keeping a temperature at 30° C., after 15 minutes adding ferrous sulfate and ethylenediamine tetraacetic acid-disodium salt to mix thoroughly to obtain a system A, and reducing the temperature to 6° C.;

step 3: adding hydrogen peroxide p-menthane prepared in the step 1 to the system A to start polymerization, where a polymerization pressure is 0.25 MPa, a polymerization temperature is 6° C., a stirring speed is 120 r/min, and a polymerization time is 11 h; after the polymerization is completed, adding sodium dimethyl dithiocarbamate, sodium nitrite, sodium polysulfide, and polyvinylamine to react for 30 minutes to obtain a modified SBR latex;

step 4: mixing the modified SBR latex with 26% sodium chloride solution to obtain a mixture, then mixing the mixture with 0.5% dilute sulfuric acid, stirring well, adding deionized water for several times, washing at 70° C. to be neutral to remove sodium chloride and dilute sulfuric acid, then performing a heat treatment with organic solvents of acetone and ethylene oxide at 60° C. for several times, and then adding the deionized water for several times to remove the organic solvents so as to obtain the cross-linked SBR microsphere binder of Example 2.

The cross-linked SBR microsphere has a particle size of 40 nm to 150 nm, a porosity of 4% to 8%, and a pore diameter of greater than 0 nm and less than or equal to 40 nm.

A lithium-ion battery in this Example includes the porous cross-linked SBR microsphere binder of the above Example 2.

The lithium-ion battery is basically the same as the lithium-ion battery in Example 1, except that the porous cross-linked SBR microsphere binder of Example 2 is used as a binder of a negative electrode sheet in the lithium-ion battery of Example 2.

Example 3

A method for preparing a cross-linked SBR microsphere binder includes the following steps:

step 1: spraying butadiene and styrene with a sodium hydroxide aqueous solution having a mass fraction of 12% at 30° C. for 2 h, respectively, and then washing with deionized water to be neutral, respectively, to obtain polymerization-inhibitor-removed butadiene and polymerization-inhibitor-removed styrene;

step 2: based on the part by mass, adding 600 parts of deionized water, 75 parts of the polymerization-inhibitor-removed styrene, 100 parts of ethyl acetate, 50 parts of acetone, 50 parts of diethyl phthalate, 100 parts of cyclohexane, 20 parts of isooctyl alcohol, 30 parts of n-butyl ether, 20 parts of succinonitrile, 20 parts of chloroform, 5 parts of urea, 3 parts of polystyrene, 2 parts of polyethylene glycol, 225 parts of the polymerization-inhibitor-removed butadiene, 6 parts of polyethylene glycol monoallyl ether, 8 parts of polyethylene glycol methyl acrylate, 8 parts of ethyl methacrylate, and 10 parts of acrylic acid to a reactor, stirring to mix well; adding 0.528 parts of dodecyl mercaptan, 15.25 parts of disproportionated rosin acid soap, 0.495 parts of sodium methylene bisnaphthalene sulfonate, 0.123 parts of sodium dithionite dihydrate, and 1.362 parts of potassium phosphate, continuously stirring to mix well, and keeping a temperature to 30° C.; after 10 minutes, adding 0.033 parts of ferrous sulfate and 0.684 parts of ethylenediamine tetraacetic acid-disodium salt, mixing fully to obtain a system A, and reducing the temperature to 8° C.;

step 3: adding 0.36 parts of cumene hydrogen peroxide to the system A to start polymerization, where polymerization conditions include a pressure in the reactor being adjusted to 0.25 MPa, a polymerization temperature of 7° C., a stirring speed of 110 r/min, and a polymerization time of 9 h, after the polymerization is completed, adding 0.33 parts of sodium dimethyl dithiocarbamate, 0.13 parts of sodium polysulfide, 0.10 parts of polyvinylamine, and 0.10 parts of sodium nitrite to react for 10 minutes to obtain a modified SBR latex;

step 4: mixing the modified SBR latex with 24% sodium chloride solution to obtain a mixture, then mixing the mixture with 0.5% dilute sulfuric acid, then stirring well, adding deionized water for several times and washing at 60° C. to be neutral to remove sodium chloride and dilute sulfuric acid, then performing a heat treatment with an organic solvent of methanol at 65° C. for several times for extraction, and then adding the deionized water for several times to remove the organic solvent of methanol to obtain the porous cross-linked SBR microsphere binder of Example 3.

The porous cross-linked SBR microsphere has a particle size of 60 nm to 200 nm, a porosity of 8% to 12%, and a pore diameter of greater than 0 nm and less than or equal to 60 nm.

A lithium-ion battery in this Example includes the porous cross-linked SBR microsphere binder of the above Example 3.

The lithium-ion battery is basically the same as the lithium-ion battery in Example 1, except that the porous cross-linked SBR microsphere binder of Example 3 is used as a binder of a negative electrode sheet in the lithium-ion battery of Example 3.

Example 4

A method for preparing a cross-linked SBR microsphere binder includes the following steps:

step 1: spraying butadiene and styrene with a sodium hydroxide aqueous solution having a mass fraction of 14% at 25° C. for 1 h, respectively, and then washing with deionized water to be neutral, respectively, to obtain a polymerization-inhibitor-removed butadiene and a polymerization-inhibitor-removed styrene;

step 2: based on the part by mass, adding 800 parts of deionized water, 100 parts of the polymerization-inhibitor-removed styrene, 150 parts of fatty acid methyl ester, 345 parts of toluene, 50 parts of isopropanol, 50 parts of di-n-amyl ether, 50 parts of methyl ethyl ketone, 50 parts of acetonitrile, 30 parts of chloroform, 20 parts of urea, 55 parts of polyethylene glycol, 300 parts of the polymerization-inhibitor-removed butadiene, 10 parts of acrylonitrile, 10 parts of methyl acrylate, 20 parts of polyethylene glycol monomethyl ether methyl methacrylate, and 10 parts of 2-ethylhexyl acrylate to a reactor, stirring to mix well; adding 0.72 parts of dodecyl mercaptan, 20.79 parts of fatty acid soap, 0.675 parts of sodium methylenedinaphthalene sulfonate, 0.18 parts of sodium dithionite dihydrate, and 2.03 parts of potassium phosphate, continuously stirring to mix well, and keeping a temperature to 35° C.; after 5 minutes, adding 0.045 parts of ferrous sulfate and 1.13 parts of ethylenediamine tetraacetic acid-disodium salt, mixing fully to obtain a system A, and reducing the temperature to 8° C.;

step 3: adding 0.54 parts of cumene hydrogen peroxide to the system A to start polymerization, where polymerization conditions include a pressure in the reactor being adjusted to 0.3 MPa, a polymerization temperature of 5° C., a stirring speed of 130 r/min, and a polymerization time of 12 h, after the polymerization is completed, adding 0.45 parts of sodium dimethyl dithiocarbamate, 0.2 parts of sodium nitrite, 0.15 parts of sodium nitrite sodium polysulfide, and 0.15 parts of sodium nitrite polyvinylamine to react for 20 minutes to obtain a modified SBR latex;

step 4: mixing the modified SBR latex with 30% a sodium chloride solution, then mixing the mixture with 0.5% dilute sulfuric acid, then stirring well, adding deionized water for several times and washing at 55° C. to be neutral to remove sodium chloride and dilute sulfuric acid, then performing a heat treatment with a mixture of organic solvents of acetone and benzene at 70° C. for several times for extraction, and then adding the deionized water for several times to remove the organic solvents to obtain the porous cross-linked SBR microsphere binder of Example 4.

The porous cross-linked SBR microsphere has a particle size of 80 nm to 300 nm, a porosity of 12% to 20%, and a pore diameter of greater than 0 nm and less than or equal to 80 nm.

A lithium-ion battery in this Example includes the porous cross-linked SBR microsphere binder of the above Example 4.

The lithium-ion battery is basically the same as the lithium-ion battery in Example 1, except that the porous cross-linked SBR microsphere binder of Example 4 is used as a binder of a negative electrode sheet in the lithium-ion battery of Example 4.

Example 5

A method for preparing a cross-linked SBR microsphere binder includes the following steps:

step 1: spraying butadiene and styrene with a sodium hydroxide aqueous solution having a mass fraction of 16% at 35° C. for 3 h, respectively, and then washing with deionized water to be neutral, respectively, to obtain a polymerization-inhibitor-removed butadiene and a polymerization-inhibitor-removed styrene;

step 2: based on the part by mass, adding 500 parts of deionized water, 62.5 parts of the polymerization-inhibitor-removed styrene, 100 parts of ethyl acetate, 100 parts of acetone, 100 parts of diethyl phthalate, 50 parts of n-heptane, 50 parts of dodecanol, 15 parts of succinonitrile, 10 parts of 1,2-dichloroethane, 10 parts of amino acid, 5 parts of polystyrene, 5 parts of polyacrylic acid, 5 parts of polyvinyl alcohol, 187.5 parts of the polymerization-inhibitor-removed butadiene, 8 parts of polyethylene glycol monomethyl ether methyl acrylate, 8 parts of polyethylene glycol monoallyl ether, and 9 parts of acrylonitrile to a reactor, stirring to mix well; adding 0.44 parts of dodecyl mercaptan, 12.71 parts of disproportionated rosin acid soap, 0.4125 parts of sodium methylene bisnaphthalene sulfonate, 0.1025 parts of sodium dithionite dihydrate, and 1.135 parts of potassium phosphate, continuously stirring to mix well, and keeping a temperature to 30° C.; after 15 minutes, adding 0.0275 parts of ferrous sulfate and 0.57 parts of ethylenediamine tetraacetic acid-disodium salt, mixing fully to obtain a system A, and reducing the temperature to 7° C.;

step 3: adding 0.30 parts of hydrogen peroxide p-menthane to the system A to start the polymerization, where polymerization conditions include a pressure in the reactor being adjusted to 0.15 MPa, a polymerization temperature of 7° C., a stirring speed of 120 r/min, and a polymerization time of 8 h, after the polymerization is completed, adding 0.275 parts of sodium dimethyl dithiocarbamate, 0.1 parts of sodium nitrite, 0.08 parts of sodium polysulfide, and 0.1 parts of polyvinylamine to react for 15 minutes to obtain a modified SBR latex;

step 4: mixing the modified SBR latex with 26% sodium chloride solution to obtain a mixture, then mixing the mixture with 0.5% dilute sulfuric acid, then stirring well, adding deionized water for several times and washing at 70° C. to be neutral to remove sodium chloride and dilute sulfuric acid, then performing a heat treatment with an organic solvent of acetone at 55° C. for several times for extraction, and then adding the deionized water for several times to remove the organic solvent to obtain the porous cross-linked SBR microsphere binder of Example 5.

The porous cross-linked SBR microsphere has a particle size of 90 nm to 400 nm, a porosity of 29% to 35%, and a pore diameter of greater than 0 nm and less than or equal to 90 nm.

A lithium-ion battery in this Example includes the porous cross-linked SBR microsphere binder of the above Example 5.

The lithium-ion battery is basically the same as the lithium-ion battery in Example 1, except that the porous cross-linked SBR microsphere binder of Example 5 is used as a binder of a negative electrode sheet in the lithium-ion battery of Example 5.

Example 6

A method for preparing a cross-linked SBR microsphere binder includes the following steps:

step 1: spraying butadiene and styrene with a sodium hydroxide aqueous solution having a mass fraction of 9% at 20° C. for 2.5 h, respectively, and then washing with deionized water to be neutral, respectively, to obtain a polymerization-inhibitor-removed butadiene and a polymerization-inhibitor-removed styrene;

step 2: based on the part by mass, adding 300 parts of deionized water, 37.5 parts of the polymerization-inhibitor-removed styrene, 100 parts of fatty acid methyl ester, 200 parts of diethyl phthalate, 100 parts of n-octane, 100 parts of di-n-amyl ether, 50 parts of methyl ethyl ketone, 50 parts of acetonitrile, 70 parts of 1,2-dichloroethane, 10 parts of amino acid, 5 parts of polystyrene, 10 parts of polyethylene glycol, 5 parts of polyacrylonitrile, 112.5 parts of the polymerization-inhibitor-removed butadiene, 10 parts of polyethylene glycol methyl methacrylate, 2 parts of methyl methacrylate, and 3 parts of acrylic acid to a reactor, stirring to mix well; adding 0.264 parts of dithiodiisopropyl xanthate, 7.63 parts of disproportionated rosin acid soap, 0.25 parts of sodium methylene bisnaphthalene sulfonate, 0.0615 parts of sodium dithionite dehydrate, and 0.682 parts of potassium phosphate, continuously stirring to mix well, and keeping a temperature to 28° C., after 10 minutes, adding 0.0165 parts of ferrous sulfate and 0.342 parts of ethylenediamine tetraacetic acid-disodium salt, mixing fully to obtain a system A, and reducing the temperature to 7° C.;

step 3: adding 0.18 parts of cumene hydrogen peroxide to the system A to start polymerization, where polymerization conditions include a pressure in the reactor being adjusted to 0.25 MPa, a polymerization temperature of 6° C., a stirring speed of 130 r/min, and a polymerization time of 10 h, after the polymerization is completed, adding 0.165 parts of sodium dimethyl dithiocarbamate, 0.056 parts of sodium nitrite, 0.056 parts of sodium polysulfide, and 0.056 parts of polyvinylamine to react for 25 minutes to obtain a modified SBR latex;

step 4: mixing the modified SBR latex with 25% sodium chloride solution to obtain a mixture, then mixing the mixture with 0.5% dilute sulfuric acid, then stirring well, adding deionized water for several times and washing at 65° C. to be neutral to remove sodium chloride and dilute sulfuric acid, then performing a heat treatment with a mixture of organic solvents of ethylene oxide and methanol at 60° C. for several times for extraction, and then adding the deionized water for several times to remove the organic solvents, thus obtaining the porous cross-linked SBR microsphere binder of Example 6.

The porous cross-linked SBR microsphere has a particle size of 90 nm to 400 nm, a porosity of 29% to 35%, and a pore diameter of greater than 0 nm and less than or equal to 90 nm.

A lithium-ion battery in this Example includes the porous cross-linked SBR microsphere binder of the above Example 6.

The lithium-ion battery is basically the same as the lithium-ion battery in Example 1, except that the porous cross-linked SBR microsphere binder of Example 6 is used as a binder of a negative electrode sheet in the lithium-ion battery of Example 6.

Example 7

A method for preparing a cross-linked SBR microsphere binder includes the following steps:

step 1: spraying butadiene and styrene with a sodium hydroxide aqueous solution having a mass fraction of 8% at 28° C. for 3.5 h, respectively, and then washing with deionized water to be neutral, respectively, to obtain a polymerization-inhibitor-removed butadiene and a polymerization-inhibitor-removed styrene;

step 2: based on the part by mass, adding 400 parts of deionized water, 50 parts of the polymerization-inhibitor-removed styrene, 100 parts of fatty acid methyl ester, 50 parts of acetone, 200 parts of toluene, 100 parts of isoamyl alcohol, 50 parts of n-butyl ether, 50 parts of acetonitrile, 30 parts of 1,2-dichloroethane, 10 parts of amino acid, 5 parts of polyethylene glycol monomethyl ether, 5 parts of polyvinyl alcohol, 150 parts of the polymerization-inhibitor-removed butadiene, 10 parts of polyethylene glycol methyl methacrylate, 4 parts of acrylic acid, and 6 parts of methyl methacrylate to a reactor, stirring to mix well; adding 0.352 parts of dodecyl mercaptan, 10.16 parts of disproportionated rosin acid soap, 0.33 parts of sodium methylene bisnaphthalene sulfonate, 0.082 parts of sodium dithionite dihydrate, and 0.908 parts of potassium phosphate, continuously stirring to mix well, and keep a temperature to 30° C.; after 8 minutes, adding 0.022 parts of ferrous sulfate and 0.456 parts of ethylenediamine tetraacetic acid-disodium salt, mixing fully to obtain a system A, and reducing the temperature to 7° C.

step 3: adding 0.24 parts of hydrogen peroxide p-menthane to the system A to start polymerization, where polymerization conditions include a pressure in the reactor being adjusted to 0.25 MPa, a polymerization temperature of 8° C., a stirring speed of 110 r/min, and a polymerization time of 9 h, after the polymerization is completed, adding 0.22 parts of sodium dimethyl dithiocarbamate, 0.075 parts of sodium nitrite, 0.075 parts of sodium polysulfide, and 0.075 parts of polyvinylamine to react for 10 minutes to obtain a modified SBR latex;

step 4: mixing the modified SBR latex with 28% a sodium chloride solution to obtain a mixture, then mixing the mixture with 0.5% dilute sulfuric acid, then stirring well, adding deionized water for several times and washing at 70° C. to be neutral to remove sodium chloride and dilute sulfuric acid, then performing a heat treatment with an organic solvent of ethanol at 65° C. for several times for extraction, and then adding the deionized water for several times to remove the organic solvent, thus obtaining the porous cross-linked SBR microsphere binder of Example 7.

The porous cross-linked SBR microsphere has a particle size of 100 nm to 1 μm, a porosity of 20% to 29%, and a pore diameter of greater than 0 nm and less than or equal to 100 nm.

A lithium-ion battery in this Example includes the porous cross-linked SBR microsphere binder of the above Example 7.

The lithium-ion battery is basically the same as the lithium-ion battery in Example 1, except that the porous cross-linked SBR microsphere binder of Example 7 is used as a binder of a negative electrode sheet in the lithium-ion battery of Example 7.

Comparative Example

A lithium-ion battery in the Comparative Example is basically the same as the lithium-ion battery in Example 1, except that commercial SBR for lithium-ion batteries is used as a binder of a negative electrode sheet in the lithium-ion battery of Comparative Example.

Test Example 1

The porous cross-linked SBR prepared in Examples 1-7 and the commercial SBR for lithium-ion batteries are measured for tensile modulus (after being immersed in an electrolytic solution), affinity with the electrolytic solution, and ionic conductivity. The test results are shown in the following table:

The tensile modulus is measured in the aspect of the breaking strength and elongation of a SBR binder after the SBR binder forms a film, then is prepared into a dumbbell shape, and immersed in the electrolytic solution for 2 and 6 days. The affinity with the electrolytic solution reflects a state of the SBR binder in the battery, and the degree of affinity with the electrolytic solution directly reflects performances of the battery. The ionic conductivity reflects the ability of the SBR material to transport lithium-ions in the lithium-ion battery system.

TABLE 1 performance test table of SBR binder

| Sample | Tensile Modulus (2 Days) Breaking Strength | Tensile Modulus (2 Days) Elongation | Tensile Modulus (6 Days) Breaking Strength | Tensile Modulus (6 Days) Elongation | Affinity with the electrolytic solution (1 Days) | Affinity with the electrolytic solution (9 Days) | Ionic Conductivity (S/cm) |
|---|---|---|---|---|---|---|---|
| commercial SBR | 0.75 MPa | 450% | 0.25 MPa | 30% | 460% | 270% | $3.66 \times 10^{-4}$ |
| Example 1 | 0.95 MPa | 460% | 0.67 MPa | 150% | 500% | 310% | $4.21 \times 10^{-4}$ |
| Example 2 | 1.34 MPa | 380% | 0.80 MPa | 120% | 580% | 340% | $4.57 \times 10^{-4}$ |
| Example 3 | 1.24 MPa | 370% | 0.72 MPa | 120% | 620% | 480% | $4.85 \times 10^{-4}$ |
| Example 4 | 1.12 MPa | 360% | 0.56 MPa | 160% | 740% | 420% | $5.26 \times 10^{-4}$ |
| Example 5 | 0.96 MPa | 450% | 0.45 MPa | 190% | 640% | 370% | $4.94 \times 10^{-4}$ |
| Example 6 | 1.44 MPa | 340% | 0.91 MPa | 180% | 690% | 400% | $5.05 \times 10^{-4}$ |
| Example 7 | 1.22 MPa | 380% | 0.81 MPa | 160% | 660% | 390% | $5.11 \times 10^{-4}$ |

It can be seen from the results in the above table that, compared with the conventional commercial SBR, the breaking strength and elongation after immersion in the electrolytic solution in the present application are effectively improved. The modified porous cross-linked SBR of the present application has better application potential. Compared with the commercial SBR, the porous cross-linked SBR of the present application has better affinity with the electrolytic solution, the main reason is that, on the one hand, SBR is subjected to copolymerization modification, which improves the affinity with the electrolytic solution, on the other hand, the modified SBR is subjected to pore-forming, so that it has more channel structures, and has more contact surfaces with the electrolytic solution. Due to its strong affinity with the electrolytic solution and strong liquid retention capacity, it has higher lithium-ion conductivity in practical applications, can more effectively transport lithium-ions, and can effectively improve the cycle performance of the lithium-ion battery.

Test Example 2

Figure 4:
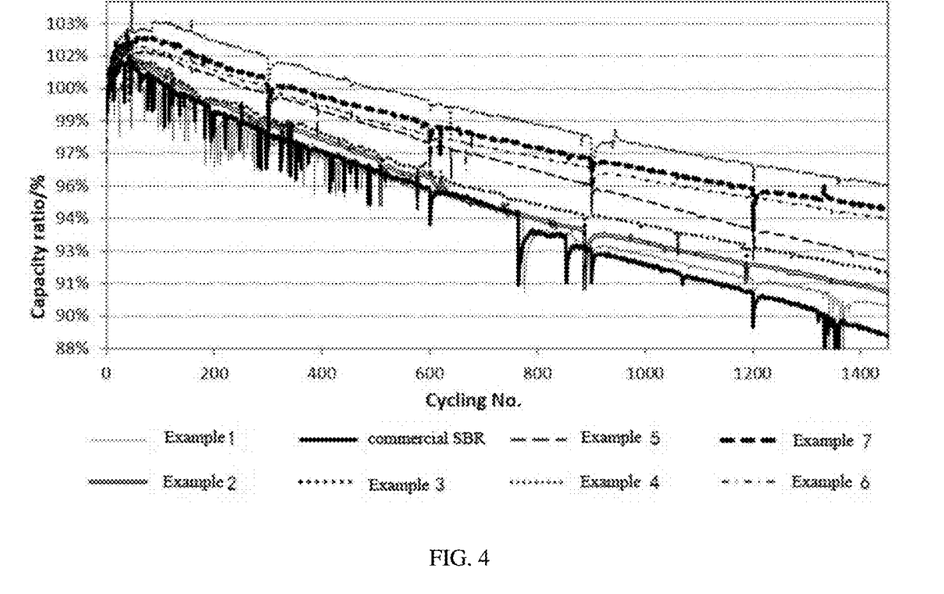
FIG. 4 is a data diagram of the cycle performance of lithium-ion batteries in Examples 1-7 and Comparative Example of the present application.

Under a normal temperature condition of 25° C., the lithium-ion batteries in Examples 1-7 and Comparative Example are charged at 1 C and discharged at 1 C with a blue dot charging and discharging instrument, and the capacity retention rate thereof after 1000 cycles and the capacity retention rate thereof after 1400 cycles are shown in Table 2. FIG. 4 is a data diagram of the cycle performance of lithium-ion batteries in Examples 1-7 and Comparative Example of the present application.

TABLE 2 capacity retention rate of lithium-ion battery

| Sample | Capacity Retention Rate after 1000 cycles | Capacity Retention Rate after 1400 cycles |
|---|---|---|
| commercial SBR | 92.0% | 89.0% |
| Example 1 | 93.0% | 90.5% |
| Example 2 | 93.5% | 90.8% |
| Example 3 | 93.8% | 92.0% |

TABLE 2-continued capacity retention rate of lithium-ion battery

| Sample | Capacity Retention Rate after 1000 cycles | Capacity Retention Rate after 1400 cycles |
|---|---|---|
| Example 4 | 97.8% | 96.0% |
| Example 5 | 95.3% | 92.5% |
| Example 6 | 96.3% | 94.0% |
| Example 7 | 96.8% | 94.8% |

From the results in Table 2 and FIG. 4, it can be seen that the lithium-ion battery prepared with the commercial SBR binder has a capacity retention rate of 89.0% after 1400 cycles; while the lithium-ion batteries prepared with the binders of Examples 1 to 7 of the present application have a capacity retention rate of 90.5%-96.0% after 1400 cycles. The main reason lies in that the porous cross-linked SBR of the present application has a good pore structure compared with the commercial SBR, and lithium-ions can directly pass through the pore structure to perform charge and discharge reactions. Therefore, during the charging and discharging process of the lithium-ion battery, the lithium-ion battery prepared with the binder of the present application has lower impedance, can effectively improve the lithium-ion transmission and the lithium-ion long-cycle performance, and has good application value.

Finally, it should be noted that the foregoing embodiments are merely intended for describing the technical solutions of the present application other than limiting the present application. Although the present application is described in detail with reference to the foregoing embodiments, persons of ordinary skill in the art should understand that they may still make modifications to the technical solutions described in the foregoing embodiments or make equivalent substitutions to some or all technical features thereof, and these modifications and substitutions will not make the essence of corresponding technical solutions depart from the range of the technical solutions of various embodiments of the present application.

What is claimed is:

1. A cross-linked SBR microsphere binder, wherein the cross-linked SBR microsphere has a porous cross-linked structure, and the cross-linked SBR microsphere has a particle size of 10 nm-1 μm.

2. The cross-linked SBR microsphere binder according to claim 1, wherein the cross-linked SBR microsphere has a porosity of 0.01%-40%.

3. The cross-linked SBR microsphere binder according to claim 1, wherein the cross-linked SBR microsphere has a porosity of 4%-29%.

4. The cross-linked SBR microsphere binder according to claim 2, wherein the cross-linked SBR microsphere has a porosity of 4%-29%.

5. The cross-linked SBR microsphere binder according to claim 1, wherein the cross-linked SBR microsphere has a porosity of 12%-29%.

6. The cross-linked SBR microsphere binder according to claim 1, wherein a pore of the cross-linked SBR microsphere has a pore diameter of greater than 0 and less than or equal to 200 nm.

7. The cross-linked SBR microsphere binder according to claim 1, wherein the cross-linked SBR microsphere binder is obtained by polymerizing a system A and an oxidizing agent, and then subjecting a polymerized system to demulsification, extraction, and washing;

the system A comprises deionized water, polymerization-inhibitor-removed styrene, a pore-forming agent, polymerization-inhibitor-removed butadiene, a molecular weight regulator, an emulsifier, a co-emulsifier, a deoxidizing agent, an electrolyte, a reducing agent, and a complexing agent.

8. The cross-linked SBR microsphere binder according to claim 7, wherein the system A further comprises a modified monomer.

9. The cross-linked SBR microsphere binder according to claim 8, wherein the modified monomer is one or more of unsaturated alkenyl polyether, unsaturated alkenyl ester, unsaturated alkenyl alcohol ether, unsaturated alkenyl nitrile, and unsaturated alkenyl acid.

10. A method for preparing the cross-linked SBR microsphere binder according to claim 1, wherein the method comprises the following steps:

step 1: spraying butadiene and styrene with a sodium hydroxide aqueous solution having a mass fraction of 8%-16% at 20-40° C., respectively, and then washing with deionized water to be neutral, respectively, to obtain polymerization-inhibitor-removed butadiene and polymerization-inhibitor-removed styrene;

step 2: based on a part by mass, adding 200-800 parts of the deionized water, 25-100 parts of the polymerization-inhibitor-removed styrene, 200-800 parts of a pore-forming agent, 75-300 parts of the polymerization-inhibitor-removed butadiene, and 0-50 parts of a modified monomer to a reactor, stirring to mix evenly, adding 0.16-0.72 parts of a molecular weight regulator, 4.62-20.79 parts of an emulsifier, 0.15-0.675 parts of a co-emulsifier, 0.025-0.18 parts of a deoxidizing agent and 0.24-2.03 parts of an electrolyte, continuously stirring to mix evenly, and keeping a temperature to 25-35° C.; then adding 0.01-0.045 parts of a reducing agent, and 0.01-1.13 parts of a complexing agent, mixing fully to obtain a system A, and reducing the temperature to 5-8° C.;

step 3: adding 0.06-0.54 parts of an oxidizing agent to the system A to start polymerization, wherein a polymerization pressure is 0.1-0.3 MPa, a polymerization temperature is 5-8° C., a stirring speed is 100-130 r/min, and a polymerization time is 7-12 h, after the polymerization is completed, adding 0.1-0.45 parts of a terminator and 0.06-0.5 parts of an auxiliary terminator to obtain a modified SBR latex;

step 4: subjecting the modified SBR latex to demulsification, extraction, and washing to obtain the cross-linked SBR microsphere binder.

11. The method for preparing the cross-linked SBR microsphere binder according to claim 10, wherein in the step 2, the pore-forming agent is one or more of alkanes, alcohols, ethers, aromatics, ketones, esters, chlorides, amines, oligomeric polystyrene, oligomeric polyether, oligomeric polyvinyl alcohol ether, oligomeric polyacrylonitrile, and oligomeric polyacrylic acid.

12. The method for preparing the cross-linked SBR microsphere binder according to claim 10, wherein in the step 2, the modified monomer is one or more of unsaturated alkenyl polyether, unsaturated alkenyl ester, unsaturated alkenyl alcohol ether, unsaturated alkenyl nitrile, and unsaturated alkenyl acid.

13. A method for preparing the cross-linked SBR microsphere binder according to claim 1, wherein the method comprises the following steps:

step 1: spraying styrene with a sodium hydroxide aqueous solution having a mass fraction of 8%-16% at 20-40°

C., and then washing with deionized water to be neutral, to obtain a polymerization-inhibitor-removed styrene;

step 2: based on a part by mass, adding 200-800 parts of the deionized water, 25-100 parts of the polymerization-inhibitor-removed styrene, 200-800 parts of a pore-forming agent, 75-300 parts of butadiene, and 0-50 parts of a modified monomer to a reactor, stirring to mix evenly, adding 0.16-0.72 parts of a molecular weight regulator, 4.62-20.79 parts of an emulsifier, 0.15-0.675 parts of a co-emulsifier, 0.025-0.18 parts of a deoxidizing agent, and 0.24-2.03 parts of an electrolyte, continuously stirring to mix evenly, and keeping a temperature to 25-35° C.; then adding 0.01-0.045 parts of a reducing agent, and 0.01-1.13 parts of a complexing agent, mixing fully to obtain a system A, and reducing the temperature to 5-8° C.;

step 3: adding 0.06-0.54 parts of an oxidizing agent to the system A to start polymerization, wherein a polymerization pressure is 0.1-0.3 MPa, a polymerization temperature is 5-8° C., a stirring speed is 100-130 r/min, and a polymerization time is 7-12 h, after the polymerization is completed, adding 0.1-0.45 parts of a terminator and 0.06-0.5 parts of an auxiliary terminator to obtain a modified SBR latex;

step 4: subjecting the modified SBR latex to demulsification, extraction, and washing to obtain the cross-linked SBR microsphere binder.

14. The method for preparing the cross-linked SBR microsphere binder according to claim 13, wherein before the step 2, the method further comprises subjecting the butadiene to a pretreatment, and the pretreatment comprises: spraying the butadiene with the sodium hydroxide aqueous solution having a mass fraction of 8%-16% at 20-40° C., and then washing with the deionized water to be neutral.

15. The method for preparing the cross-linked SBR microsphere binder according to claim 13, wherein in step 2, the pore-forming agent is one or more of alkanes, alcohols, ethers, aromatics, ketones, esters, chlorides, amines, oligomeric polystyrene, oligomeric polyether, oligomeric polyvinyl alcohol ether, oligomeric polyacrylonitrile, and oligomeric polyacrylic acid.

16. The method for preparing the cross-linked SBR microsphere binder according to claim 13, wherein in step 2, the modified monomer is one or more of unsaturated alkenyl polyether, unsaturated alkenyl ester, unsaturated alkenyl alcohol ether, unsaturated alkenyl nitrile, and unsaturated alkenyl acid.

17. A lithium-ion battery, wherein it comprises a positive electrode, a negative electrode, and a separator; and at least one of the positive electrode, the negative electrode, and the separator comprises the cross-linked SBR microsphere binder according to claim 1.

18. Use of the cross-linked SBR microsphere binder according to claim 1 in lithium-ion batteries.

* * * * *